(12) United States Patent
Pak et al.

(10) Patent No.: US 8,711,724 B2
(45) Date of Patent: Apr. 29, 2014

(54) METHOD AND APPARATUS FOR MANAGING BACKUP CHANNEL IN MULTI-CHANNEL ENVIRONMENT

(75) Inventors: Jin Suk Pak, Daegu-si (KR); Gwang Zeen Ko, Daejeon-si (KR); Sung Jin You, Daejeon-si (KR); Byung Jang Jeong, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 152 days.

(21) Appl. No.: 13/303,418

(22) Filed: Nov. 23, 2011

(65) Prior Publication Data
US 2012/0140654 A1 Jun. 7, 2012

(30) Foreign Application Priority Data
Dec. 1, 2010 (KR) ........................ 10-2010-0121228

(51) Int. Cl.
*H04L 12/26* (2006.01)
(52) U.S. Cl.
USPC .......................................... 370/252; 370/438

(58) Field of Classification Search
USPC .................. 370/252, 253, 334, 350, 433, 438
See application file for complete search history.

(56) References Cited

U.S. PATENT DOCUMENTS

| | | | |
|---|---|---|---|
| 2006/0294573 A1* | 12/2006 | Rogers et al. ................. | 725/147 |
| 2008/0240146 A1* | 10/2008 | Singh et al. ................... | 370/458 |
| 2009/0197626 A1* | 8/2009 | Huttunen et al. ............. | 455/522 |
| 2010/0069013 A1* | 3/2010 | Chaudhri et al. ........... | 455/67.11 |
| 2010/0330919 A1* | 12/2010 | Gurney et al. ............. | 455/67.11 |

* cited by examiner

*Primary Examiner* — Gary Mui
(74) *Attorney, Agent, or Firm* — William Park & Associates Patent Ltd.

(57) ABSTRACT

The present invention relates to a method and apparatus for managing a backup channel in a multi-channel environment. According to an aspect of the present invention, the method of managing a backup channel in a multi-channel environment includes transmitting a control region of a super frame through a first channel constituting the multi-channel and transmitting a data region of the super frame to a destination terminal through a second channel constituting the multi-channel. A transmission quality of the first channel is acquired using the control region transmitted through the first channel.

10 Claims, 8 Drawing Sheets

METHOD AND APPARATUS FOR MANAGING BACKUP CHANNEL IN MULTI-CHANNEL ENVIRONMENT

Priority to Korean patent application number 10-2010-0121228 filed on Dec. 1, 2010, the entire disclosure of which is incorporated by reference herein, is claimed.

BACKGROUND OF THE INVENTION

1. Field of the Invention

The present invention relates to wireless communication and, more particularly, to a method and apparatus for managing a backup channel in a multi-channel environment.

2. Discussion of the Related Art

In a Cognitive Radio (CR) network, when a priority order user appears, an operating channel has to be conceded to the priority order user, and the operating channel has to be switched. Candidate channels for switching the operating channel are managed. A list of the candidate channels is called a backup channel. The backup channel is generated on the basis of information about whether there is a user in a corresponding channel based on sensing or DB information and information about whether the corresponding channel is available.

In order to send data over a CR network, a CR device does not use one transmission method, but optimizes and uses a transmission method according to a channel condition. The CR device may send data in accordance with a Single Input Single Output (SISO) method using a single antenna, a Multiple Input Multiple Output (MIMO) method using multiple antennas, or using one or more channels at the same time. Furthermore, data may be transmitted by changing modulation methods, such as QPSK, 16 QAM, and 64 QAM.

Quality information about a backup channel generated using a sense function or DB information informs whether each channel is available, but does not inform the transmission quality of the corresponding channel. Communication channels may have different transmission qualities according to a method of sending data or modulation methods, or every channel or every transmission/reception terminal. In other words, a CR device trying to send a radio frame using a channel has to send the radio frame by adjusting a transmission method or a modulation method or both according to the state of the corresponding channel. For example, in the case where a channel state is good when a modulation method to be used is determined, the radio frame may be transmitted by raising a modulation order.

In the case where a priority order user appears in a channel now being operated and a channel has to be switched to a backup channel, there may be a problem in that requirements of service already being served are not satisfied owing to the channel switching because the transmission quality of the channel now being operated differs from the transmission quality of the previous backup channel.

For example, assuming that a CR device using multiple antennas supports both the MIMO transmission method and the SISO transmission method, the MIMO transmission method and the SISO transmission method have not only different maximum transmission rates, but also different transmission qualities according to each channel. Accordingly, in the case where the operating channel of a CR device sending data in a specific channel according to the MIMO transmission method switches to another channel, there is a case where a transmission quality provided in the previous specific channel according to the MIMO transmission method does not remain intact in the switched another channel.

Furthermore, the transmission quality varies per channel, per time, and the location of a terminal. In a CR network in which the switching of a channel is generated during operation, not only the transmission quality of an operating channel, but also the transmission quality of a backup channel to switch has to be taken into consideration when the channel is switched. If channel switching is performed by not taking the transmission quality into consideration, there may be a problem in that Quality of Service (QoS) of data already being served is not satisfied until the transmission quality of a moved channel is determined. Furthermore, there is a time delay problem until a transmission method has to be adjusted by measuring the transmission quality of the moved channel.

Accordingly, not only a backup channel is configured and managed on the basis of only information about whether a channel is available, but also information about the transmission quality of a generated backup channel has to be further managed. In order to solve the problem, a method and apparatus for managing a backup channel in a multi-channel environment needs to be taken into consideration.

SUMMARY OF THE INVENTION

It is an object of the present invention to provide a method and apparatus for maintaining and managing a reliable backup channel and easily managing channels for the use of multiple channels in a CR network supporting the use of multiple channels.

Another object of the present invention is to provide a method and apparatus for performing reliable channel switching in a CR network supporting the use of multiple channels.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Hereinafter, embodiments of the present invention are described in detail with reference to the accompanying drawings so that they can be readily implemented by those skilled in the art.

The terminals of a CR network may perform communication using a single channel or perform data communication using multiple channels. In the case where the use of multiple channels is supported as described above, there is a need for a scheme for managing the use of multiple channels.

As a method of managing multiple channels, there is a method of selecting a specific channel as a Common Control Channel (CCC) and sending channel control information through the CCC. In this method, since a specific channel is used for only control, CR terminals existing in all the channels are increased and thus available channels are reduced. If a channel environment changes to a channel environment in which multiple channels cannot be used, it is difficult to secure channels to be allocated for common control information transmission.

In order to solve the above problem, the present invention suggests a method of dividing the existing super frame structure into a beacon and control part and a data transmission/reception part, performing transmission through the existing super frame structure in the case where the transmission is performed in a single channel, sending the beacon and control part through a backup channel in the case where the transmission is performed in multiple channels, and sending the data transmission/reception part through an operating channel. According to the method suggested by the present invention, one super frame structure can be used both when a single channel is used and when multiple channels are used.

In the case where multiple separated channels are used, overhead for a beacon, control, and quality measurement can be minimized because the quality of a backup channel is measured using the beacon and control part transmitted through the backup channel. In order to support the above method, schedule information may be further included. The data transmission/reception part may include information about a backup channel and schedule information about a channel now being operated.

If data is transmitted through the operating channel and, at the same time, the transmission quality of a backup channel is managed as described above, reliability of the backup channel (that is, a candidate channel to move in a CR network) can be further increased. Furthermore, if the transmission quality of the backup channel is better than the transmission quality of the operating channel, a channel to guarantee always the best transmission quality can be used as a transmission channel by changing the operating channel to the backup channel. Embodiments are described below.

Figure 1:
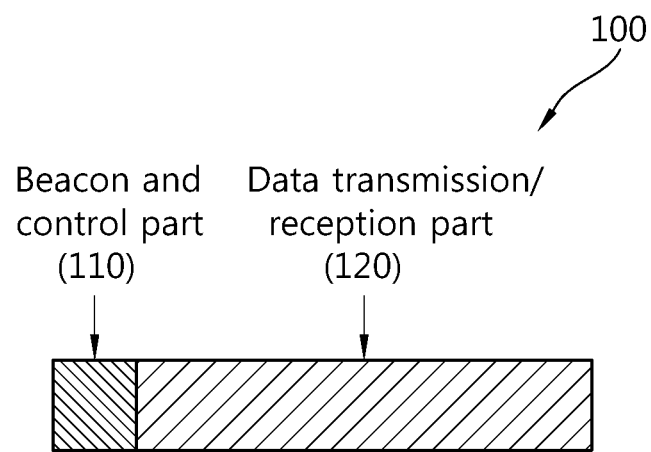
FIG. 1 is a simple diagram showing the structure of a super frame which is applicable to an embodiment of the present invention.

FIG. 1 is a simple diagram showing the structure of a super frame which is applicable to an embodiment of the present invention.

The super frame 100 applicable to the embodiment of the present invention includes a beacon and control part 110 and a data transmission/reception part 120.

The beacon and control part 110 is a region where one or more of a beacon transmission/reception process, including a process of measuring the transmission quality of CR terminals, a channel information request process, and a response process are performed. Beacon information may include at least one of information about an operating channel being used for data transmission and a backup channel, information about a method of measuring a transmission quality, and information about a transmission quality measurement schedule.

The data transmission/reception part 120 is a region where a data transmission/reception process, including one or more of a process of CR terminals transmitting and receiving operating channel information and a process of transmitting and receiving backup channel information, is performed. In the case where the data transmission/reception process is performed in a different channel from the beacon and control process, the data transmission/reception part 120 may include a beacon frame for data transmission/reception synchronization and data transmission/reception schedule management. The data transmission/reception part 120 may further include information about a backup channel in which the beacon and control process is being performed. For convenience of description, the beacon and control part 110 may also be referred to as a control region and the data transmission/reception part 120 may also be referred to as a data region.

Figure 2:
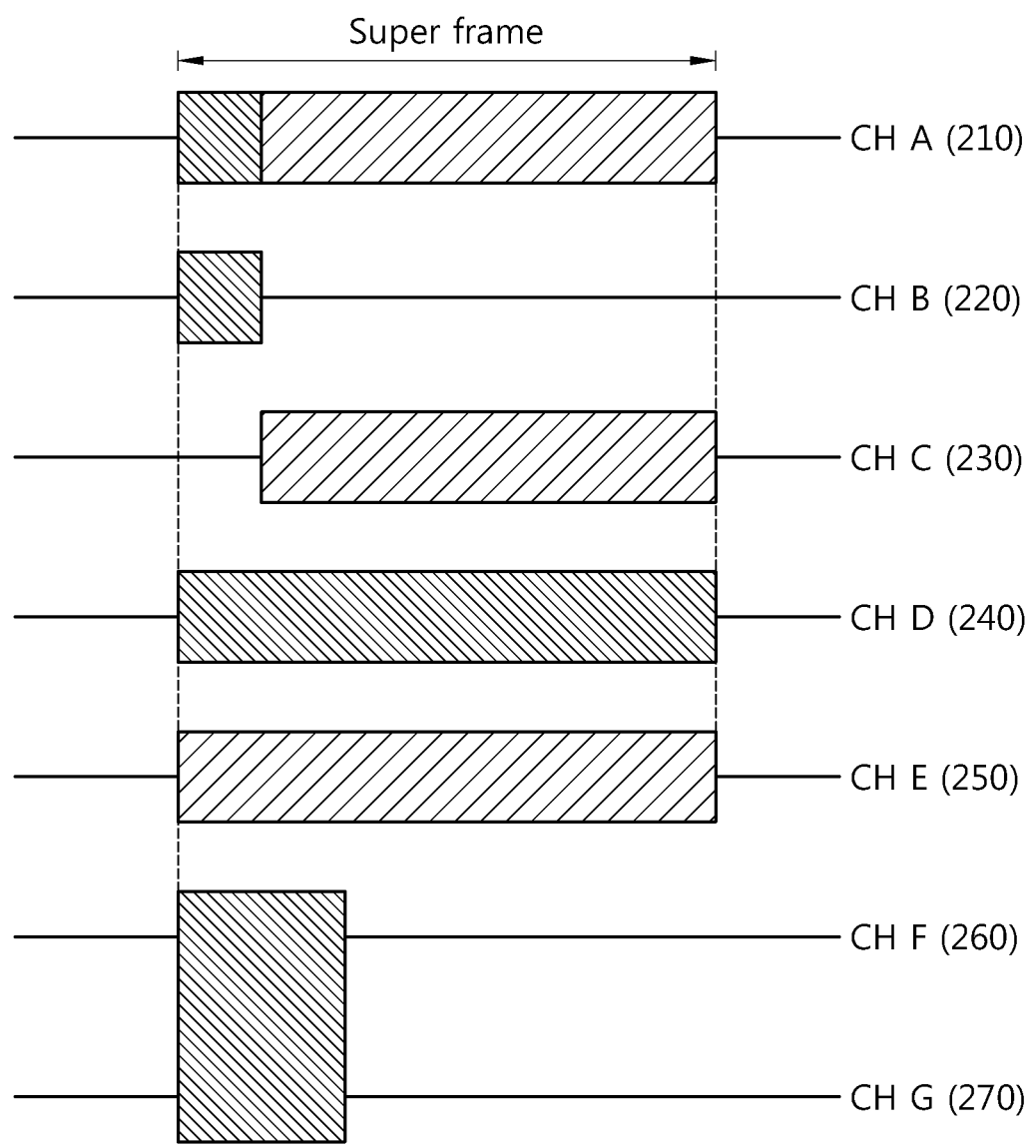
FIG. 2 shows various examples of a method of transmitting a super frame according to an embodiment of the present invention.

FIG. 2 shows various examples of a method of transmitting a super frame according to an embodiment of the present invention.

The super frame divided into two parts (that is, the control region and the data region) may be transmitted through a transmission channel in various forms, such as those shown in FIG. 2. The super frame transmitted through a CH A (210) of FIG. 2 is an example of transmission when a single channel is used. In the case where a CR system uses a single channel (that is, if a backup channel is not generated or does not exist), the super frame has to be transmitted using one channel, and thus the control region and the data region may not be separated from each other and transmitted through separate channels. Accordingly, as in the case where the super frame is transmitted through the CH A (210) of FIG. 2, the control region and the data region operate in one channel CH A (210).

If a backup channel exists, the control region and the data region of the super frame may be separated from each other and transmitted. For example, assuming that a CR system may use a CH B (220) and a CH C (230), the control region may be transmitted through the CH B (220) and the data region may be transmitted through the CH C (230). Here, the CH B (220) may be a channel constituting the backup channel.

In the case where the control region and the data region are separated from each other and transmitted, the transmission period of the control region or the data region or both may be expanded in the total super frame period according to a quality measurement schedule or a data transmission/reception schedule of channels through which the control region and the data region are transmitted. The transmission of the super frame through a CH D (240) and a CH E (250) of FIG. 2 is an example of such expansion. Here, the CH D (240) may be a channel constituting a backup channel (that is, a target channel for quality measurement).

For another example, as in an example in which the control region is transmitted through a CH F (260) and a CH G (270), the control region may be transmitted through not one channel, but two or more channels, and thus a quality measurement schedule may be allocated to two or more channels.

FIG. 2 shows an example of the method of transmitting a super frame, proposed by the present invention. The method of transmitting a super frame according to the embodiment of the present invention is not limited to the example shown in FIG. 2. The control region may be separated from the data region and transmitted through a target channel for quality measurement, and the target channel for quality measurement may be one or more channels. The target channel for quality measurement may be one of backup channels.

Figure 3:
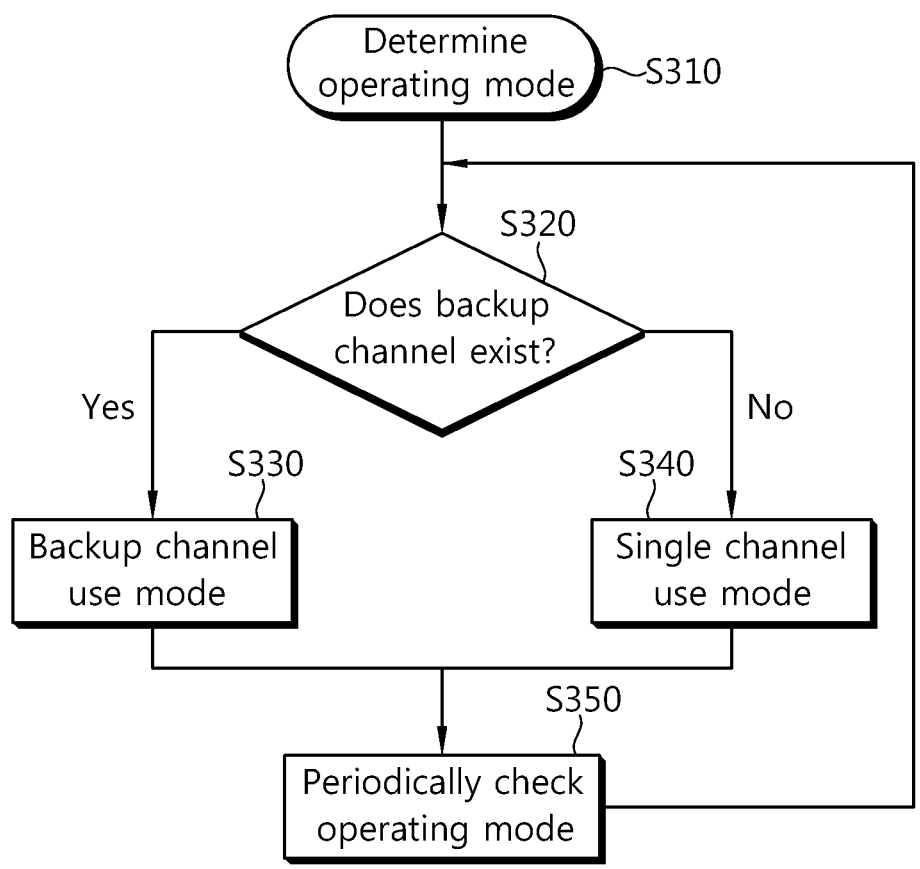
FIG. 3 is a flowchart illustrating an example of a procedure of a CR terminal determining an operating mode.

FIG. 3 is a flowchart illustrating a procedure of a CR terminal determining an operating mode for determining a method of transmitting the control region (that is, the beacon and control part) and the data region (that is, the data transmission/reception part) according to whether a backup channel exists. In order to determine the operating mode at step S310, the CR terminal determines whether a backup channel exists at step S320. If, as a result of the determination, the backup channel is determined to exist, the CR terminal switches to a backup channel use mode at step S330 so that the control region can be transmitted through the backup channel. If, as a result of the determination, the backup channel is determined not to exist, the CR terminal operates in a single channel use mode at step S340. When the CR terminal operates in the single channel use mode, the control region and the data region are transmitted through one operating channel, as in the transmission of the super frame through the CH A (210) of FIG. 2. The switching of the operating mode is performed by periodically checking (S350) whether a backup channel exists.

Figure 4:
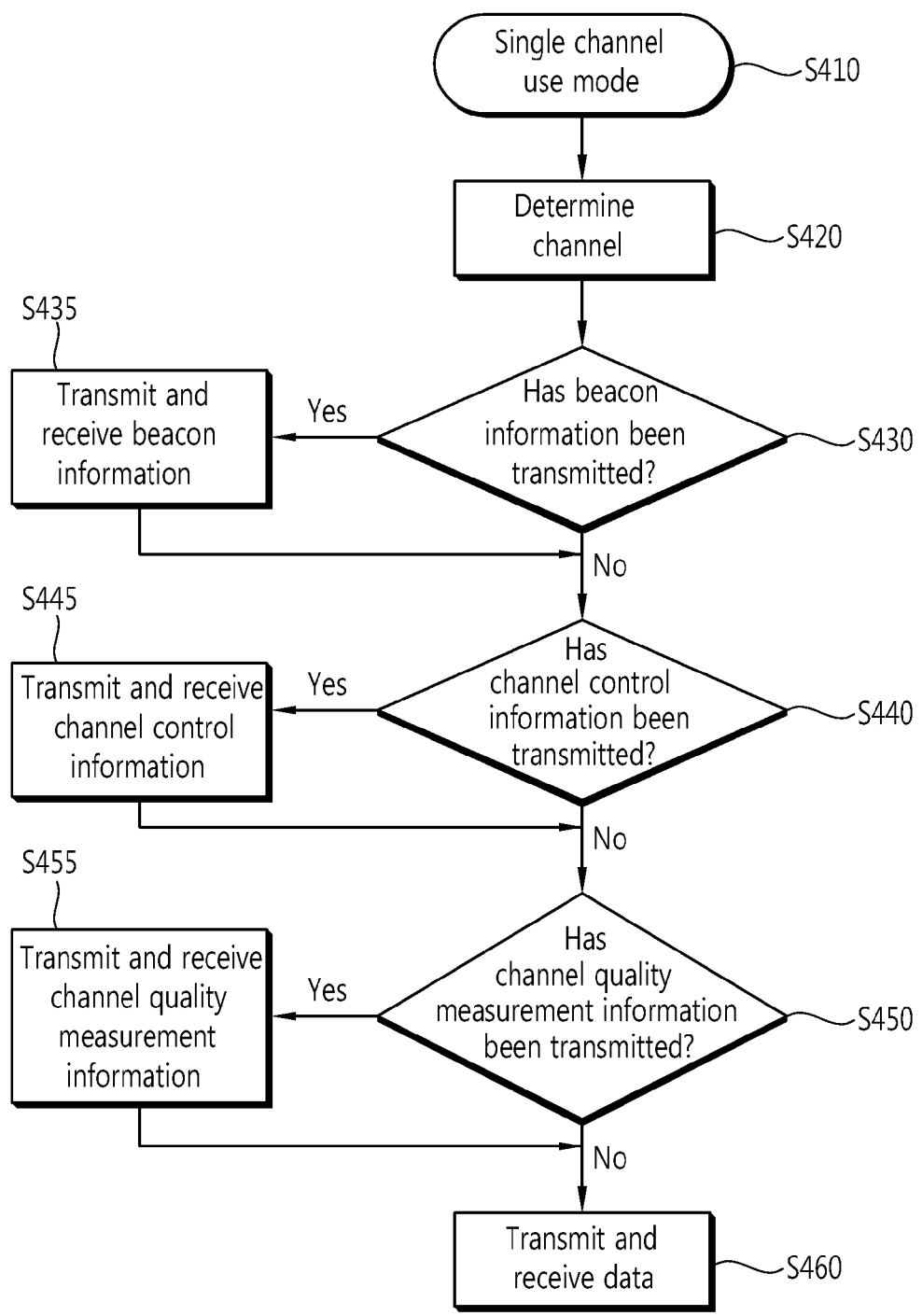
FIG. 4 is a flowchart illustrating an example of the operation of a CR terminal in a single channel use mode.

FIG. 4 is a flowchart illustrating an example of the operation of a CR terminal in a single channel use mode.

If, at step S410, the single channel use mode is determined as the operating mode of the CR terminal in a procedure of determining an operating mode, such as that shown in FIG. 3, the CR terminal determines an operating channel at step S420. Next, the CR terminal performs a process of transmitting beacon information based on a beacon schedule, a process of transmitting and receiving control information according to the allocation of a super frame, and a process of transmitting and receiving channel quality measurement information. In the case where the beacon based on the beacon schedule is determined to be transmitted through a process of determining whether beacon information has been transmitted at S430, the CR terminal performs a process of transmitting and receiving the beacon information at step S435. In the case where the control information according to the allocation of the super frame is determined to be transmitted through a process of determining whether the channel control information has been transmitted at step S440, the CR terminal performs a process of transmitting and receiving the channel control information at step S445. In the case where the channel quality measurement information is determined to be transmitted performed through a process of determining whether the channel quality measurement information has been transmitted at step S450, the CR terminal performs a process of transmitting and receiving the channel quality measurement information at step S455. After the CR terminal performs the process of transmitting beacon information based on a beacon schedule, the process of transmitting and receiving control information according to the allocation of a super frame, and the process of transmitting and receiving channel quality measurement information, the CR terminal transmits and receives data at step S460.

Figure 5:
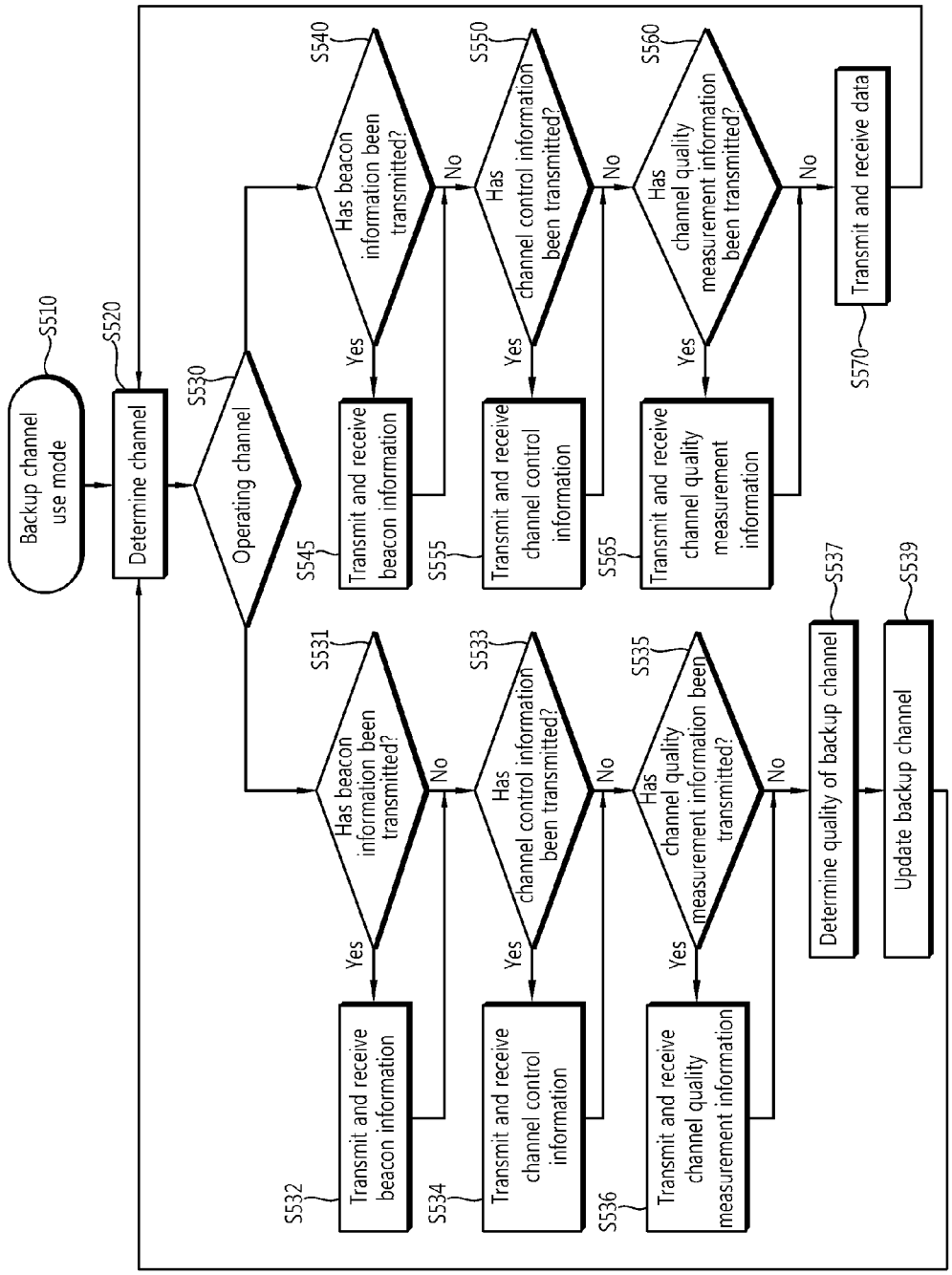
FIG. 5 is a flowchart illustrating the operation of a CR terminal in a backup channel use mode.

FIG. 5 is a flowchart illustrating the operation of a CR terminal in a backup channel use mode. If the backup channel use mode is determined as the operating mode of the CR terminal at step S510, the CR terminal determines a channel at step S520. If the determined operating channel is a backup channel, the CR terminal branches to a backup channel routine and operates, and if the determined operating channel is a transmission channel, the CR terminal branches to a transmission channel routine and operates at step S530. If the determined operating channel is a transmission channel, the CR terminal performs a process of transmitting beacon information based on a beacon schedule, a process of transmitting and receiving control information according to the allocation of a super frame, and a process of transmitting and receiving channel quality measurement information. In the case where the beacon based on the beacon schedule is determined to be transmitted through a process of determining whether beacon information has been transmitted at S540, the CR terminal performs a process of transmitting and receiving the beacon information at step S545. In the case where the control information according to the allocation of the super frame is determined to be transmitted through a process of determining whether the channel control information has been transmitted at step S550, the CR terminal performs a process of transmitting and receiving the channel control information at step S555. In the case where the channel quality measurement information is determined to be transmitted performed through a process of determining whether the channel quality measurement information has been transmitted at step S560, the CR terminal performs a process of transmitting and receiving the channel quality measurement information at step S565. After the CR terminal performs the process of transmitting beacon information based on a beacon schedule, the process of transmitting and receiving control information according to the allocation of a super frame, and the process of transmitting and receiving channel quality measurement information, the CR terminal transmits and receives data at step S530.

If the determined operating channel is a backup channel, the CR terminal transmits respective frames according to whether beacon information has been transmitted and received and whether channel control information has been transmitted and received. The CR terminal determines the quality of the backup channel by measuring the quality of a channel including the transmission quality of the channel according to a channel quality measurement schedule. The CR terminal updates information about the backup channel using the determined backup channel quality.

In the case where the beacon based on the beacon schedule is determined to be transmitted through a process of determining whether beacon information has been transmitted at S531, the CR terminal performs a process of transmitting and receiving the beacon information at step S532. In the case where the control information according to the allocation of the super frame is determined to be transmitted through a process of determining whether the channel control information has been transmitted at step S533, the CR terminal performs a process of transmitting and receiving the channel control information at step S534. In the case where the channel quality measurement information is determined to be transmitted performed through a process of determining whether the channel quality measurement information has been transmitted at step S535, the CR terminal performs a process of transmitting and receiving the channel quality measurement information at step S536. Next, the CR terminal determines the quality of the backup channel at step S537 and updates information about the backup channel at step S539.

A channel quality measurement frame may be transmitted as occasion demands even in the transmission channel not the backup channel. Data is transmitted and received according to a specific data transmission schedule, and the quality of an operating channel is compared with the quality of a backup channel based on the results of data transmission and reception. If, as a result of the comparison, there is a backup channel with an excellent quality, the operating channel may switch to the backup channel with an excellent quality.

If the above method is used, although a sense process is not periodically performed, transmission qualities can be compared every super frame and data can be transmitted using a channel having the best quality. Furthermore, even though one or more channels are used, multiple channels are allocated in order of the best quality from among measured backup channels. Accordingly, data can be transmitted using a channel having always excellent quality.

Figure 6:
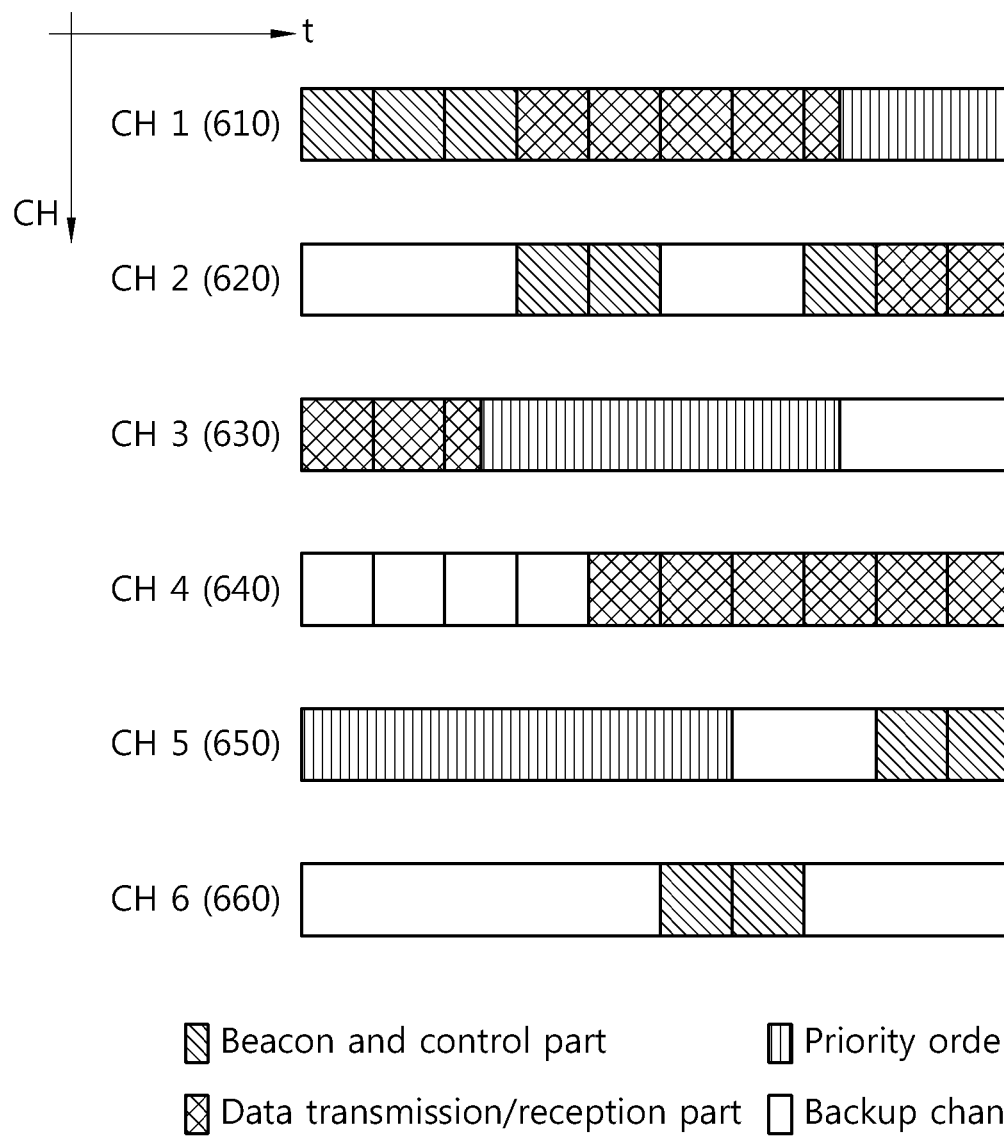
FIG. 6 shows an example of a method of transmitting a super frame according to an embodiment of the present invention.

FIG. 6 shows an example of a method of transmitting a super frame according to an embodiment of the present invention.

A CR terminal operating in a multi-channel environment selects a channel, generates backup channels, and selects one of the generated backup channels. FIG. 6 shows an example in which a CR terminal selects a CH 3 (630) as an operating channel through which data is transmitted and received and selects a CH 1 (610) as a backup channel. The CR terminal transmits data through the operating channel of the CH 3 (630) and, when a priority order user appears, switches the operating channel to the CH 1 (610) (that is, the backup channel whose quality is being measured). Here, the CH 1 (610) selected from among the backup channels and on which quality measurement is being performed is allocated as the operating channel, and another backup channel (e.g., a CH 2 (620)) is selected. A control region for measuring the quality of a backup channel is transmitted through the CH 2 (620).

In the case where during the time for which the control region is transmitted through the backup channel and the quality of a channel is measured using the control region, the quality of a channel is poor and two or more channels are managed in a backup channel list, another backup channel may be selected and the quality of the backup channel may be measured. FIG. 6 shows an example in which a CR terminal measures the quality of the CH 2 (620) through the transmission of the control region, changes a CH 6 (660) as a target channel for quality measurement, measures the quality of the CH 6 (660), and then changes the CH 2 (620) and the CH 5 (650) as target channels for quality measurement.

When a priority order user appears in the operating channel (that is, the CH 1 (610)), the CR terminal changes the operating channel to the CH 2 (620) (that is, the backup channel on which quality measurement is being performed), selects the CH 5 (650) as the backup channel, and performs the same process.

Each backup channel list may be updated on the basis of sense or DB information or may be updated through the measurement of a backup channel quality.

In the case where data is transmitted using one or more channels, such as the CH 1 (610) and the CH 4 (640), information about each of the operating channels is known through the control region, and information about a backup channel through which the control region is transmitted and schedule information about each operating channel are produced into a beacon and transmitted through each of the operating channels.

Figure 7:
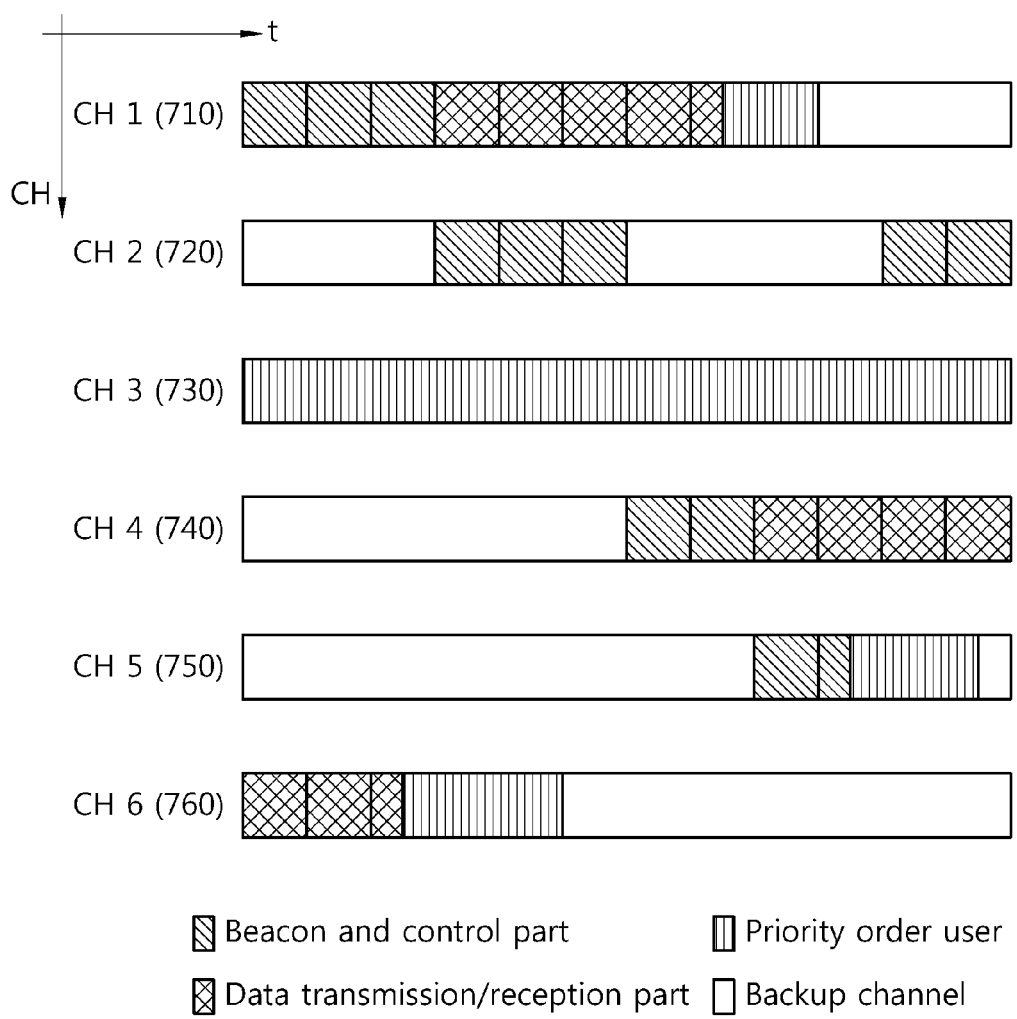
FIG. 7 shows another example of a method of transmitting a super frame according to an embodiment of the present invention.

FIG. 7 shows another example of a method of transmitting a super frame according to an embodiment of the present invention.

When a priority order user appears in a CH 5 (750) (that is, a backup channel) through which the control region of the super frame is transmitted as in FIG. 7, a channel moves to another backup channel and the control region is transmitted through another backup channel. FIG. 7 shows an example in which when a priority order user appears in the CH 5 (750), the control region of the super frame is transmitted through a CH 2 (720). A change of a channel through which the control region is transmitted (that is, a change of a target channel for quality measurement) may be performed when the quality of a corresponding channel is not good as a result of quality measurement for the corresponding channel in addition to the case where a priority order user appears in the corresponding channel. Alternatively, the qualities of all the backup channels may be measured, and a target channel for quality measurement may be sequentially switched to all the backup channels or to channels selected among a plurality of backup channels in order to update a backup channel list. In the case where the quality of a target channel for quality measurement is not good, another backup channel is selected, the control region is transmitted through the selected backup channel, and the quality of the backup channel is measured, the quality of a corresponding channel may be measured by transmitting the control region of the super frame through the corresponding channel after a lapse of a certain time.

Figure 8:
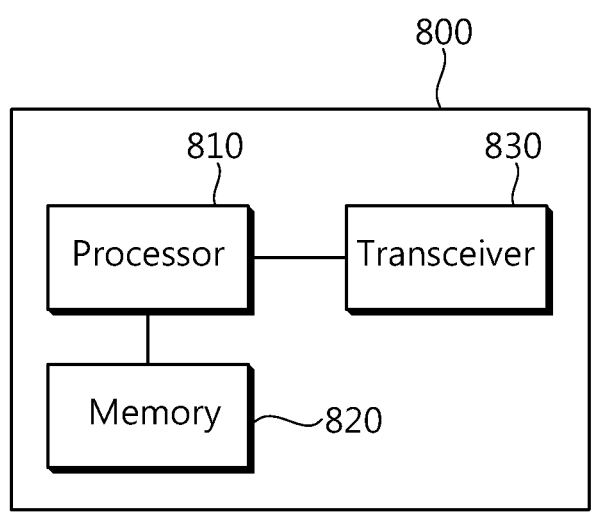
FIG. 8 is a block diagram of a wireless apparatus in which an embodiment of the present invention is implemented.

FIG. 8 is a block diagram of a wireless apparatus in which an embodiment of the present invention is implemented.

The wireless apparatus 800 includes a processor 810, memory 820, and a transceiver 830. The transceiver 830 is configured to transmit and receive the control region and the data region of a super frame. The processor 810 is functionally connected to the transceiver 830 and configured to generate the control region or the data region or both of the super frame and transmit the control region or the data region or both through the transceiver 830 or implement the operations of a CR terminal which have been described in the embodiments of the present invention, such as the measurement of the quality of a channel through the control region and the data region of a super frame received through the transceiver 830 and the switching of a channel. The wireless apparatus 800 may operate as a station of IEEE 802.11af and IEEE 802.22 according to a wireless communication protocol implemented in the processor 810 or as a wireless apparatus of CR communication supporting the ECMA 392 standard. The wireless apparatus 800 of the present invention is not limited to the station and the terminal supporting the above-described communication standards, and it may function as a terminal which is operated in a wireless communication system for managing and updating backup channels in a multi-channel environment and performing channel switching according to a channel environment as in the embodiments of the present invention.

The processor 810 or the transceiver 830 or both may include an Application-Specific Integrated Circuit (ASIC), other chipsets, logic circuits, and/or data processors. The memory 820 may include Read-Only Memory (ROM), Random Access Memory (RAM), flash memory, a memory card, a storage medium and/or other storage devices. When the embodiment is implemented in software, the above method may be implemented using a module process, a function, etc. for performing the above functions. The module may be stored in the memory 820 and executed by the processor 810. The memory 820 may be external or internal to the processor 810 and may be connected to the processor 810 by well-known means.

The above-described embodiments include various aspects of illustrations. Although all the possible combinations for describing the various aspects may not be described, a person having ordinary skill in the art may appreciate that other combinations are possible. Accordingly, the present invention should be construed to include all other replacement, modifications, and changes which fall within the claims.

In a CR network supporting multiple channels, backup channels can be managed, one or more data transmission channels can be managed at the same time, and one or more backup channels and data transmission channels can be effectively managed. Furthermore, a backup channel having an excellent channel quality can be maintained and a channel having always an excellent transmission quality can be used as a data transmission channel by performing a process of selecting a backup channel, a process of checking the quality of the selected backup channel, and a process of changing a backup channel and a data channel.

What is claimed is:
1. A method of a terminal managing a backup channel in a multi-channel environment, the method comprising:

determining whether to operate in a backup channel use mode or a single channel use mode according to whether the backup channel exists;

if the backup channel exists, switching to the backup channel use mode and determining a transmission channel and a backup channel;

measuring a transmission quality of the backup channel;

updating information about the backup channel by taking a result of the measurement of the transmission quality of the backup channel into consideration; and transmitting data to a destination terminal through the transmission channel;

wherein the single channel use mode uses a single channel for transmitting both a control region and a data region; and wherein the backup channel use mode separates the data region from the control region through the use of multiple channels.

2. The method of claim 1, further comprising, when a third terminal having a priority order in using the transmission channel appears in the transmission channel, setting the backup channel as a new transmission channel and transmitting data through the new transmission channel.

3. The method of claim 2, further comprising:

when the backup channel is set as the new transmission channel, setting a new backup channel, and measuring a transmission quality of the new backup channel and updating the information about the backup channel based on a result of the measurement.

4. The method of claim 1, further comprising, if the transmission quality of the backup channel as a result of the measurement of the transmission quality of the backup channel is better than a transmission quality of the transmission channel, setting the backup channel as a new transmission channel and transmitting data through the new transmission channel.

5. The method of claim 4, further comprising:

when the backup channel is set as the new transmission channel, setting a new backup channel, and measuring a transmission quality of the new backup channel and updating the information about the backup channel based on a result of the measurement.

6. A terminal, comprising:

a transceiver configured to transmit and receive a radio frame; and a processor functionally connected to the transceiver, wherein the processor is configured to:

determine whether to operate the terminal in a backup channel use mode or a single channel use mode according to whether a backup channel exists, if the backup channel exists, switch to the backup channel use mode and determine a transmission channel and a backup channel, measure a transmission quality of the backup channel, update information about the backup channel by taking a result of the measurement of the transmission quality of the backup channel into consideration; and transmit data to a destination terminal through the transmission channel;

wherein the single channel use mode uses a single channel for transmitting both a control region and a data region; and wherein the backup channel use mode separates the data region from the control region through the use of multiple channels.

7. The terminal of claim 6, wherein when a third terminal having a priority order in using the transmission channel appears in the transmission channel, the process sets the backup channel as a new transmission channel and transmits data through the new transmission channel.

8. The terminal of claim 7, wherein when the backup channel is set as the new transmission channel, the process or sets a new backup channel and measures a transmission quality of the new backup channel and updating the information about the backup channel based on a result of the measurement.

9. The terminal of claim 6, wherein if the transmission quality of the backup channel as a result of the measurement of the transmission quality of the backup channel is better than a transmission quality of the transmission channel, the processor sets the backup channel as a new transmission channel and transmits data through the new transmission channel.

10. The terminal of claim 9, wherein when the backup channel is set as the new transmission channel, the process or sets a new backup channel and measures a transmission quality of the new backup channel and updating the information about the backup channel based on a result of the measurement.

* * * * *